United States Patent [19]

Frey, Jr. et al.

[11] Patent Number: 5,201,044
[45] Date of Patent: Apr. 6, 1993

[54] DATA PROCESSING METHOD FOR FILE STATUS RECOVERY INCLUDES PROVIDING A LOG FILE OF ATOMIC TRANSACTIONS THAT MAY SPAN BOTH VOLATILE AND NON VOLATILE MEMORY

[75] Inventors: Alexander H. Frey, Jr., Pasadena; Richard C. Mosteller, Sierra Madre, both of Calif.; Joel M. Gould, Norwood, Mass.; Noah R. Mendelsohn, Arlington, Mass.; James Perchik, Cambridge, Mass.

[73] Assignee: International Business Machines Corporation, Armonk, N.Y.

[21] Appl. No.: 509,853

[22] Filed: Apr. 16, 1990

[51] Int. Cl.$^5$ .............................................. G06F 15/00
[52] U.S. Cl. .................................... 395/575; 395/800; 364/DIG. 1; 364/230; 364/231.9; 364/285
[58] Field of Search ............... 395/650, 600, 800, 425, 395/575; 371/7, 10.1, 11.1

[56] References Cited

U.S. PATENT DOCUMENTS

| | | | |
|---|---|---|---|
| 4,228,496 | 10/1980 | Katzman et al. | 364/200 |
| 4,319,336 | 3/1982 | Anderson et al. | 364/900 |
| 4,412,285 | 10/1983 | Neches et al. | 364/200 |
| 4,815,028 | 3/1989 | Saitoh | 364/900 |
| 4,819,159 | 4/1989 | Shipley et al. | 364/200 |
| 4,878,167 | 10/1989 | Kapulka et al. | 364/200 |
| 4,945,474 | 7/1990 | Elliott et al. | 364/200 |
| 5,095,421 | 3/1992 | Freund | 395/650 |

OTHER PUBLICATIONS

Mueller et al., "A Nested Transaction Mechanism for Locus", Operating Systems Review, vol. 17, No. 5, pp. 71-89.
Gerald Popek and Bruce J. Walker, "The Locus Distributed System Architecture", The MIT Press, Chapter 3, pp. 46-48.
Chang et al., "Evolution of Storage Facilities in the AIX System", IBM RISC System/6000 Technology, 1990, pp. 138-142.
Lindsay et al., "Computation and Communication in R*: A Distributed Database Manager", ACM Transactions on Computer Systems, voo. 2, No. 1, pp. 24-38.

Primary Examiner—Robert B. Harrell
Assistant Examiner—Mehmet Geckil
Attorney, Agent, or Firm—Perman & Green

[57] ABSTRACT

A data processing system includes both volatile and nonvolatile memories, user-inaccessible file control software and performs a method for recovering from a malfunction occurring during a file transaction that prevents accomplished microscopic transactions from being lost. The method comprises the steps of: providing a log file to maintain a record of file transactions which may span both the volatile and nonvolatile memories; recording in the portion of the log file in volatile memory, old and new data images which result during a file transaction; writing the old and new data images to a portion of the log file which is contained in nonvolatile memory, with the new data image being written after it is certain that the old data image is present in the nonvolatile memory; and in the event of a malfunction, employing the log file in nonvolatile memory to determine the status of a file transaction and rolling back the transaction in the event the malfunction occurred prior to its completion, and further assuring that all file system actions have actually occurred for transactions marked as completed.

11 Claims, 7 Drawing Sheets

DATA PROCESSING METHOD FOR FILE STATUS RECOVERY INCLUDES PROVIDING A LOG FILE OF ATOMIC TRANSACTIONS THAT MAY SPAN BOTH VOLATILE AND NON VOLATILE MEMORY

FIELD OF THE INVENTION

This invention relates to software operating systems for parallel computing networks, and more particularly, to a user-invisible, file-based transaction system for a parallel computing network.

BACKGROUND OF THE INVENTION

Certain large data processing systems employ a multiplicity of independent, computer/disk systems (called "nodes"), which operate in parallel on discrete portions of a problem. In such systems, data files are sometimes distributed across the nodes so as to balance nodal work loads and protect against significant losses of data should one or more nodes malfunction. All nodes continuously interact with one-another and are interdependent insofar as successful completion of data processing actions are concerned.

The prior art evidences such systems and describes various methods for inter-nodal control and protection against data loss in the event of a malfunction. In U.S. Pat. No. 4,228,496 to Katzman et al., a multiprocessing system is disclosed wherein memory maps enable the creation of protection functions for individual nodal memory modules. The system also includes a sophisticated parity protection scheme to detect and correct bit errors.

In U.S. Pat. No. 4,412,285 to Neches et al., a multiprocessing system is described which employs various protocols for updating processing states between nodes. Little consideration is given, in this patent, to the possibility of individual nodal failure.

As parallel computing systems have come into vogue through the availability of lower cost and more capable processors, nodal failure problems have attracted more attention. This is due to the difficulty of reestablishing a system's processing states and restarting the system, while avoiding the need to completely reload the entire system's software. In this regard, attention has been given to defining certain system transactions as "atomic" and assuring that a record is kept of all actions within a transaction until all such actions have been completed. The actions which comprise an atomic transaction are tracked through a transaction management system. The system contains a record, or log, of each action performed during the processing of the transaction and enables the system to know when a transaction has either been completed or not completed.

In U.S. Pat. No. 4,319,336 to Anderson et al., a transaction-based system is described and employs a user-available keyboard entry device. Each transaction which does not "close", results in an interactive status message that enables the central computer to re-initialize the state of the transaction. Consideration is not given to the failure of a system element during the process of a transaction.

In U.S. Pat. No. 4,819,159 to Shipley et al., a fault-tolerant, parallel computing system is shown which employs transaction-based processing. In the Shipley et al. system, transactions are handled at the "user program or process" level so that transactions are considered on a macroscopic basis, insofar as the system is concerned. The transaction system stores pre-image and subsequent-image data in a transaction log. If an abort occurs during a transaction, the available pre-image of the data enables the system to reset to the state which existed prior to the transaction failure.

Prior art transaction management systems known to the inventors hereof, have been mainly applied to relatively macroscopic functions occurring within a computing system. Thus, such transaction logs and the functions they performed were largely under the control of the application system programmer and did not enable transaction logging within the system's "microscopic" actions to be carried out by the operating system in a manner transparent to the application system programmer. Thus, when a prior art macroscopic transaction was "rolled back", a number of microscopic functions which had been properly completed were scrapped during the rollback process. Such rollbacks created an unnecessary loss of processing time and, in a parallel processor, created ripple effects throughout parallel processing nodes.

Notwithstanding the use of transaction systems to assure macroscopic data integrity, when a portion of a file-based system malfunctions, the ability to reconstruct and restart the file system can be extraordinarily complex. For instance, in a system employing a Unix operating system, the reconstruction of a file system involves carrying out complete file system consistency checks that can take hours to complete. Such checks involve determining the consistency of disk directories, file tables, free data block lists, pointers in files to other files, etc. etc. Those comparisons involve detailed and time consuming data handling and greatly hinder a systems rapid recovery from a malfunction.

To partially avoid the time consuming consistency checks, the AIX System marketed by the IBM Corporation, employs certain logging techniques common to data base systems. (See Chang et al., "Evolution of Storage Facilities in the AIX System", IBM RISC System/6000 Technology, IBM document SA23-2619, pp. 138-142, 1990.) The AIX System limits itself to logging "metadata" (internally generated file identifier data) but does not log the file contents per se—nor does the AIX System concern itself with distributed file systems.

Another technique for file construction is described by Mueller et al. in "A Nested Transaction Mechanism for LOCUS" ACM Operating System Review, Proceedings of 9th ACM Symposium on Operating System Principles, pp. 71-89 (1983) and "The Locus Distributed System Architecture" edited by Popek et al, MIT Press, pp. 46-48, (1985). A "shadow paging" technique is there described wherein two copies of image data are always made, with the original data copy not being discarded until the transaction employing the new image copy has successfully completed.

Another distributed data-base management system with fault recovery capabilities is discussed by Lindsay et al in "Computation and Communication in R*: A Distributed Database Manager," ACM Transactions on Computer Systems, Vol. 2, No. 1, Feb. 1984, pp. 24-38. The Lindsay et al database employs a distributed transaction system and a nested form of a two-phase commit protocol to insure that all sites of a transaction come to the same conclusion as to the outcome of the transaction. There is no indication in the paper of the particular log-management strategy employed by Lindsay et al and how or whether it copes with "microscopic" transactions.

Accordingly, it is an object of this invention to provide an improved transaction logging and control system for a distributed file storage system in a parallel computing system.

It is still another object of this invention to provide an improved transaction logging and control system for microscopic-level operations in a distributed file system.

It is yet another object of this invention to provide a transaction logging and control system for data in a distributed file system which is invisible to the application programmer.

It is another object of this invention to provide a transaction logging and control system which assures distributed file system consistency in the event of a system malfunction and thus provides for rapid file system recovery.

SUMMARY OF THE INVENTION

A data processing system includes both volatile and nonvolatile memories, user-inaccessible file control software and performs a method for recovering from a malfunction occurring during a file transaction that prevents accomplished microscopic transactions from being lost. The method comprises the steps of: providing a log file to maintain a record of file transactions, which log file may span both the volatile and nonvolatile memories; recording in the portion of the log file in volatile memory, old and new data images which result during a file transaction; writing the old and new data images to a portion of the log file which is contained in nonvolatile memory, with the new data image being written after it is certain that the old data image is present in the nonvolatile memory; and in the event of a malfunction, employing the log file in nonvolatile memory to determine the status of a file transaction and rolling back the transaction in the event the malfunction occurred prior to its completion, and further assuring that all file system actions have actually occurred for transactions marked as completed.

DETAILED DESCRIPTION OF THE INVENTION

Figure 1:
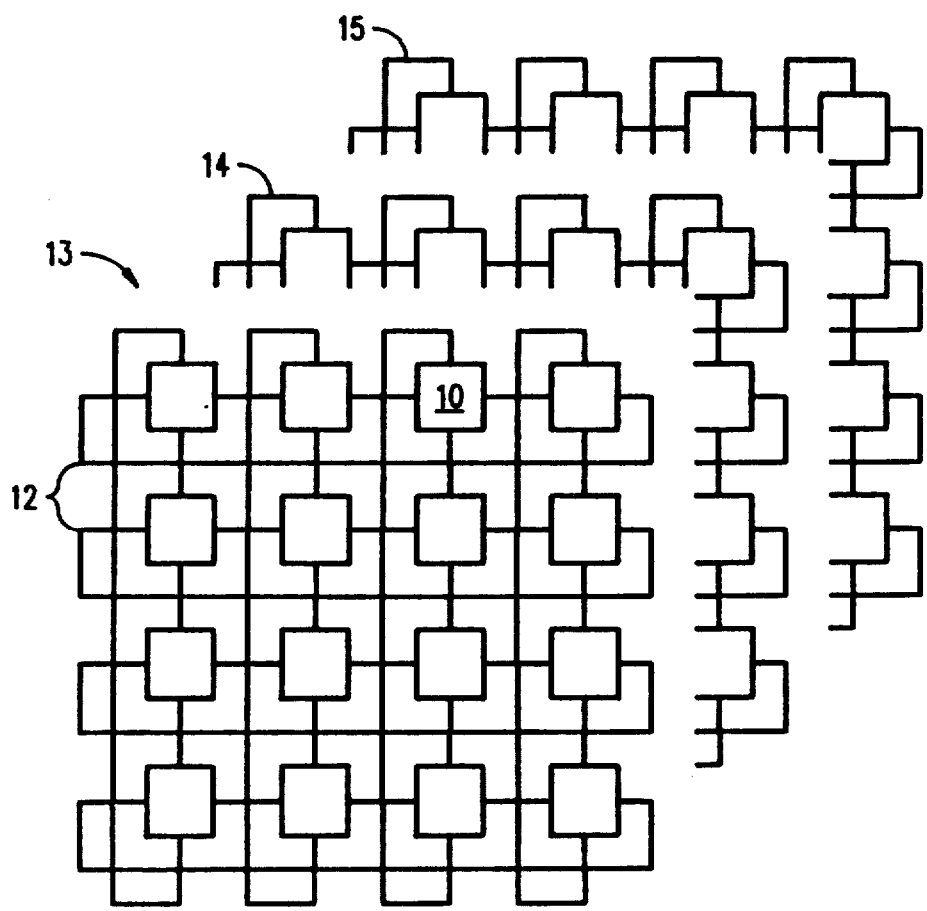
FIG. 1 is a block diagram of a multi-node parallel computing system.

Referring to FIG. 1, a block diagram is shown of a parallel computing system which comprises a number of "nodes" 10 interconnected by high speed communication links. Each node 10 comprises a processor and both volatile and non-volatile memory (e.g., disk memory); operates independently; and interacts with other nodes via the communication network.

The topology shown in FIG. 1 is that of a three-dimensional torus, with each box 10 representing a node and each line 12 representing a communication link. A first plane 13 of the parallel computing system is shown and is positioned over underlying planes 14 and 15. Each node has two additional links, not shown, one to a counterpart node in the two dimensional torus above and one to the counterpart node in the two dimensional torus below.

Figure 2:
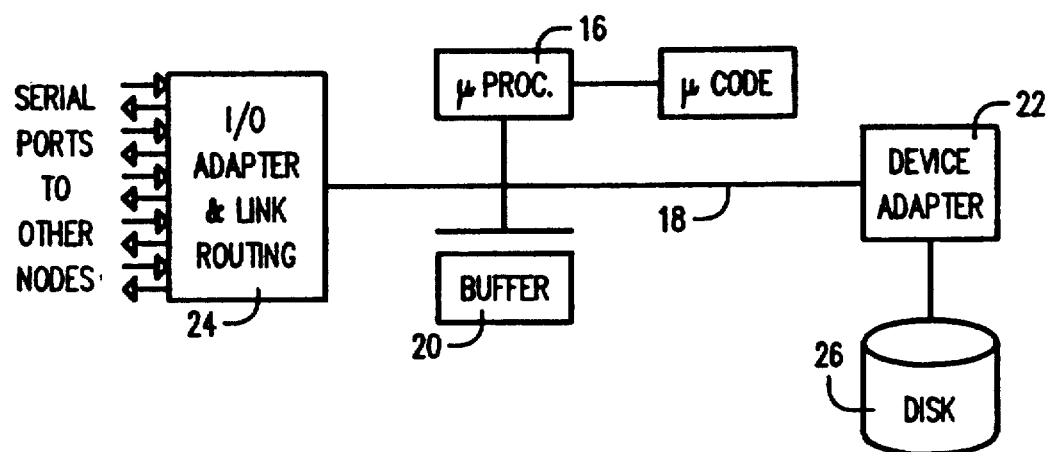
FIG. 2 is a block diagram illustrating the configuration of a node in FIG. 1.

As shown in FIG. 2, each node comprises a microprocessor 16 which is interconnected to other elements of the node via a bus structure 18. Buffer memory 20, device adapter 22 and I/O adapter and link router 24 are also connected to bus 18. A disk file 26 is connected to device adapter 22 and is controlled thereby to provide the main nonvolatile memory for the node. As is well known, microprocessor 16 contains a substantial volatile memory structure including various cache memories, some of which are employed by this invention.

Figure 3:
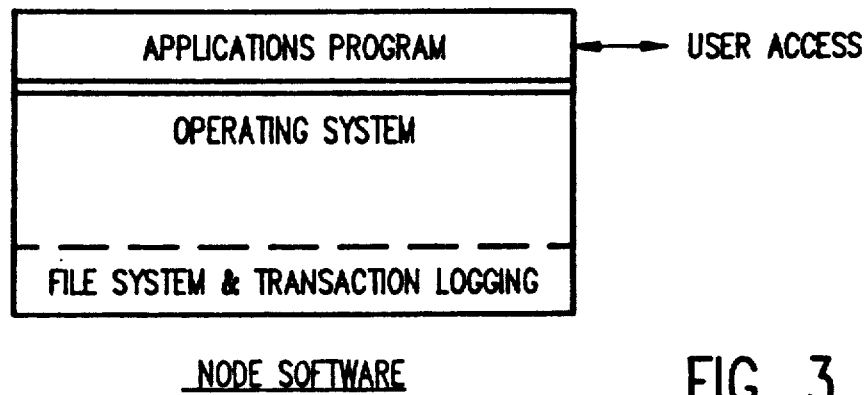
FIG. 3 is a diagram illustrating the programming systems which operate the system of FIG. 1.

The parallel computing system of FIGS. 1 and 2 employs at each node, in the well known manner, software at both the application and operating system levels. As shown in FIG. 3, user access is through the applications portions of the software. The operating system portion has limited direct user access through a well-defined programmer interface and contains, as a part of that operating system, a file system and transaction logging portion. Each node is provided with its own software system and has an independent file system and transaction logging system. Both software and data are organized on a file basis, with each file having one or more memory blocks of a predetermined length. Each block is generally byte-organized with, for example, a block including 1024 bytes. A file may comprise a single block or a multiplicity of blocks.

From a user's perspective, a file appears as a single, uniform entity from any node. Each file is accessed through a system-wide unique pointer. Through the use of that pointer, a process or application is enabled to look up further information corresponding to a file, through a directory.

The system of FIG. 1 employs a distributed file system wherein file blocks are distributed across a plurality of nodes. This structure provides both performance improvements and enhanced malfunction recovery capabilities. There are several types of failures that may occur in a system such as shown in FIG. 1, where the system must be able to automatically recover and restore its file system. This is especially important with respect to the file system that is internal to the operating system and not available to an application programmer. To maintain local and distributed file system integrity, this invention employs a transaction log system.

A transaction is defined as a unit of work consisting of a sequence of actions wherein all of its actions must complete, or the entire transaction is aborted. Examples of transactions in a file system are: creating a file; allocating space on disk for a file; updating a parity-protected data block; etc.

A transaction log file is employed to keep track of the progress of all transactions as they are carried out. Until a transaction is complete, the log file contains enough information to enable reconstruction of the state of the system before the commencement of the transaction. Conceptually, the log file increases forever; however in practice, it is truncated periodically in a process called "log switch".

When a log switch occurs, information in the log file about old, completed transactions is discarded, making room for more entries in the file. A fixed region in disk memory is preallocated for the log file. Nearly always, one portion of the log file will be in the microprocessor's volatile memory, while another portion will have been written to disk. It should be kept in mind that the log file is separate from "base" data files which are also maintained on disk and contain the actual file data. As will be seen below, at times during the operation of the system, the log file will contain duplicate copies of file data which is also present in "base" data files.

As above stated, a transaction is an atomic unit of work. It comprises the execution of a specified sequence of operations, beginning with a "begin transaction" operation; continuing either with a "commit" or "rollback" operation; and finishing with an "end transaction". The commit operation signals successful completion of the transaction. Rollback is used in the case of unsuccessful completion of the transaction, in which case the system is returned to the initial state before the transaction started (prior to "end transaction" being written in the log).

Figure 4:
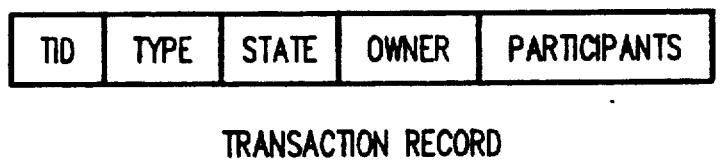
FIG. 4 illustrates the data content of a transaction record.

To keep track of active transactions, each transaction is assigned a unique identification number (TID). In a node, there is a volatile memory area assigned as a "transaction table" that lists all transactions currently in progress. Each entry in the transaction table is referred to as a transaction record and its format is shown in FIG. 4. In addition to a TID, the transaction record includes a Type field which defines the sequence of actions to be carried out in the transaction, e.g., update-parity, open a file, recover from a malfunction, etc. The State field indicates whether the transaction is in-process, commit, or rollback. The Owner field indicates the node which invoked the transaction. The Participants field is a list of other nodes which will participate in the transaction and includes the node number of the participant nodes, the response expected from the participants, a flag to show if an acknowledgement has been received from the participants, and a pointer to the next data structure.

There are two types of transactions: local and distributed. Local transactions involve only a single node while distributed transactions require the cooperation of several participant nodes.

As above stated, critical to the operation of the transaction function is a log file which keeps track of the individual actions within a transaction until the entire transaction is completed. Each node maintains its own independent log file whose identifier is stored in a designated area on the node's disk and also in its volatile memory.

Figure 5:
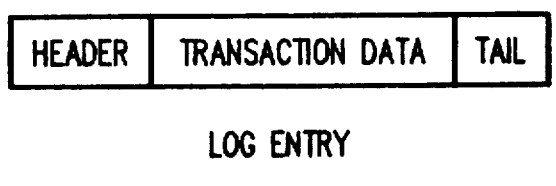
FIG. 5 illustrates the data content of a log entry.

A log file entry is indicated at FIG. 5 and comprises three main fields. The Header field is a copy of the transaction record of FIG. 4. The Transaction data is that data which is needed to undo the transaction. For instance, if a data entry is being modified, the current or "old" data image will be stored in the transaction data field so that if a malfunction occurs prior to "new" or "modified" data being written to disk, information is available as to the original or "old" state of the data. The "new" or "modified" data also may be included in the transaction data field so that the transaction may be "committed" prior to the base data being modified on disk. Finally, the Tail is a small non-zero value which is used to verify that the entire log entry was written.

Figure 6:
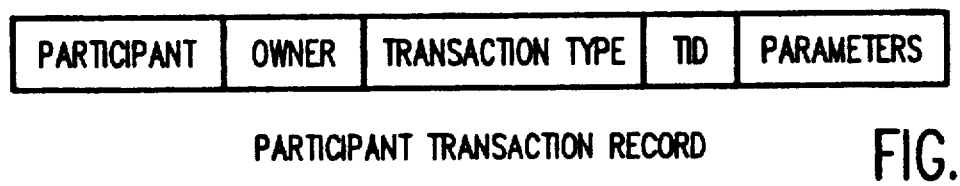
FIG. 6 illustrates the data content of a participant transaction entry.

If a transaction involves more than one node, during processing time, the invoking node assembles a Participant Transaction Record to be used by the participant node to accomplish its portion of the transaction. That record is shown in FIG. 6 and includes a designation of the participant node; a designation of the owning node, a definition of the transaction type, the TID, and parameters involved in the carrying out of the participant node's transaction portion. For instance, if a parity update is the transaction type, the parameters field will include data such as the exclusive-OR result of the old data with the new data to provide parity update, a copy of the new data block, the number of the new data block and the size of the data block.

The transaction system of this invention enables a node to recover from a malfunction by reestablishing an initial file system data state. When a node malfunctions, volatile memory is often lost. However, data which has been written to disk (nonvolatile) will be retained and can be recovered when the node again becomes functional. The portion of the transaction log which has been written to disk enables the file system to know which transactions are complete or were in process at the time the malfunction occurred.

To enable the file system to maintain data consistency after a malfunction, a pair of variables are provided called "current water level" and "end of file" (EOF) pointer. Current water level is a variable which indicates the number of bytes of data in that portion of the transaction log file that has been written to disk. As additional portions of the log file are written to disk, the current water level variable is updated accordingly. The EOF pointer is a variable indicating the number of bytes in the entire log file (that which is both on disk and in volatile memory).

The current water level and EOF pointer variables are used as follows. When a transaction is commenced and a log entry (such as shown in FIG. 5) is assembled and stored in volatile memory, an old data image is present in the transaction data field portion of the entry. Associated with that log entry in volatile memory is an EOF pointer value (the total number of bytes in the log file when the entry is assembled).

Subsequent to the creation of the old data image log entry, the node performs the necessary actions to accomplish the transaction. Then, assuming that the old data image is to be modified, a new buffer is constructed in volatile memory that includes a new data image for the transaction data. Associated with this new data buffer to-be-written, is the EOF pointer value which was included with the transaction log entry that included the old data image.

The system employs several rules to assure that data can be recovered in the event of a malfunction. The first rule is that an old data image for a transaction must be written in the log file on disk, before a new data image for that transaction can be written into the base data file on disk. This rule assures in the event of the occurrence of a malfunction before a commit mark is written into the log file, that a complete old data image is present in the log file nonwithstanding the state of the base data file. The second rule is that a new data image for a given transaction must be written on disk either in the log file or in base data before a "commit" mark is written to the log. Thus, the presence of a commit mark in the log file guarantees that a valid new data image is present on the disk.

The current water level and EOF pointer are instrumental in the implementation of the rules. No new data image of any transaction can be written to base data on disk unless its "EOF pointer" value is equal to or less than the value of the current water level variable. Thus, a new data image will only be written to base data on disk when the value of the EOF pointer for the new data image is equal to or less than the water level value then extant. This assures that the old data image has already been written to disk and is preserved, prior to the new data image being written to disk.

The above stated protocol assures, after the commencement of a transaction, that new data is not written to disk unless there is already a copy of the old data already on disk. Furthermore, after the occurrence of a malfunction, when the transaction log is reviewed, all that needs to be known is whether there is a "commit" indicator for a transaction. If not, the old data image is available in the log to reestablish the file system's state which existed prior to the commencement of the transaction.

Figure 7:
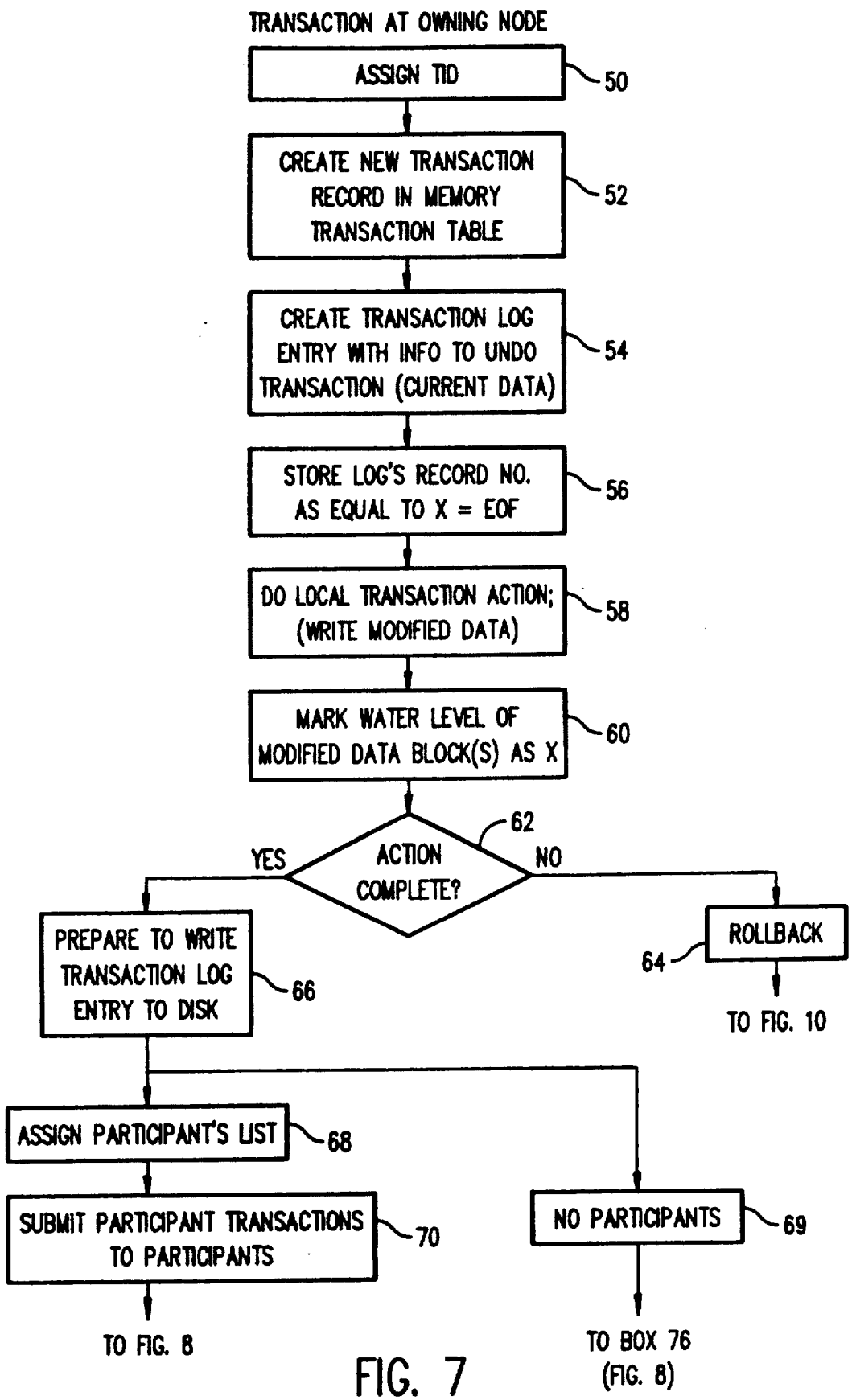
FIG. 7 is a high level flow diagram illustrating the operation of the invention at a node where a transaction commences.

Turning now to FIG. 7, there is shown a flow diagram of a transaction operating at an "owning" node. As aforestated, an "owning" node is the one which initially invokes the transaction. First, a transaction identifier (TID) is assigned (box 50) and a transaction record entry is created and placed in memory (box 52). Then, a transaction log entry is created with sufficient information to enable the transaction to be undone in the event of a subsequent malfunction (box 54). That log entry, as aforestated, will often include the old data image, and is assigned a record number value equal to X which is, in turn, equal to the value of the EOF variable for the log file (box 56).

The actions called for by the transaction are then performed and a new transaction data entry, including the new data, is written into volatile memory (box 58). That new data entry has associated with it a water level value equal to X (box 60). At this state, the system determines whether required actions have been completed (box 62), and if not, a rollback procedure (box 64) is commenced to undo the transaction (this will be described below with respect to FIG. 10).

If the actions have been completed or a copy of a new data image is in the log file which will enable an action to be completed at a later time, a system command is given which prepares to write the transaction log entries to disk (box 66). If there are no participating nodes (box 69), the process jumps immediately to box 76 in FIG. 8. There, as indicated, the new image data may be written to a base data file on disk when variable X is equal to or less than the current water level value. In other words, the new image data is written to disk when the appended EOF variables are equal to or less than the byte count of the log file on disk. If the value of X of the new data image is greater than the current water level, then the system waits until the required conditions are satisfied for writing to disk.

At this point, the system determines whether any further actions are yet to occur (box 78) and if so performs those actions (box 80). If there are no further actions, box 82 is skipped and a commit function commences (box 84). That function involves the creation of a log entry which indicates "transaction complete". That entry is then written to disk and the transaction record may be deleted from volatile memory.

Figure 8:
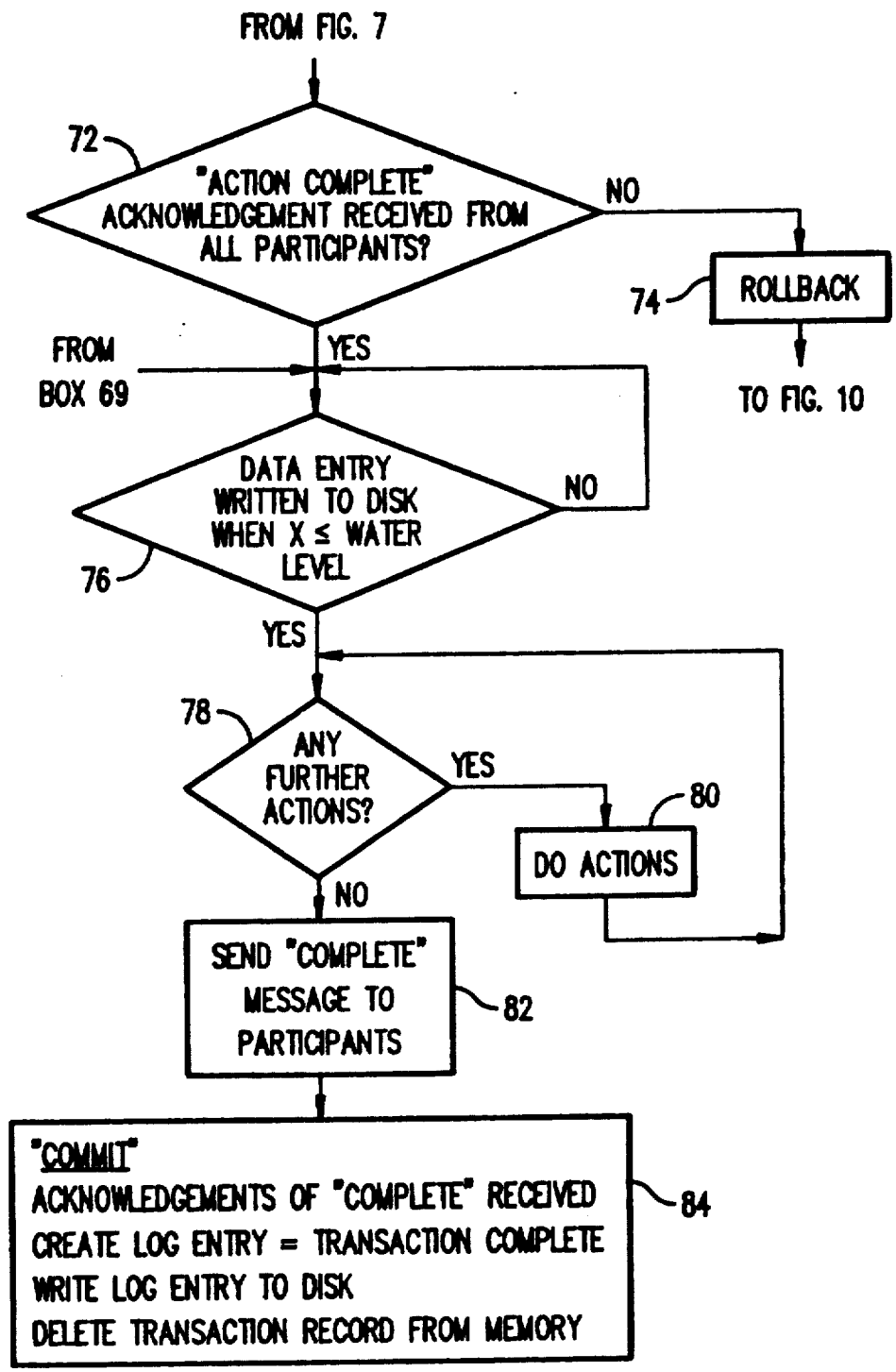
FIG. 8 is a continuation of the flow diagram of FIG. 7.

Turning back to FIG. 7, if participant nodes are involved in the transaction, then (box 68) a participants list is assigned and the transactions to be performed by the participant nodes are submitted to the participants (box 70) where they are performed. Then if, as shown in FIG. 8, "action complete" acknowledgements are not received from all participants within a predetermined period, (box 72), a rollback of the transaction occurs (box 74). On the other hand, if action complete and acknowledgements are received from all participants, then the log entries are written to disk, as indicated in box 76.

At this point, assuming no further actions are to be performed, "complete" messages are then sent to the participants (box 82). In effect, this accomplishes a two phase "commit" operation. The first phase of the commit occurs when each participating node indicates that it can complete or roll-back its action. The second phase occurs when the originating node has received "commit" indications from each of its participating nodes and knows that all required actions at all participating notes can be completed. The originating node then writes its commit mark to non-volatile memory, after which it sends a "complete" message to each of the participants enabling them to perform the transaction actions (box 82). Once the "complete" messages are acknowledged by the participant nodes, the originating node can mark its transaction complete (box 84).

Figure 9:
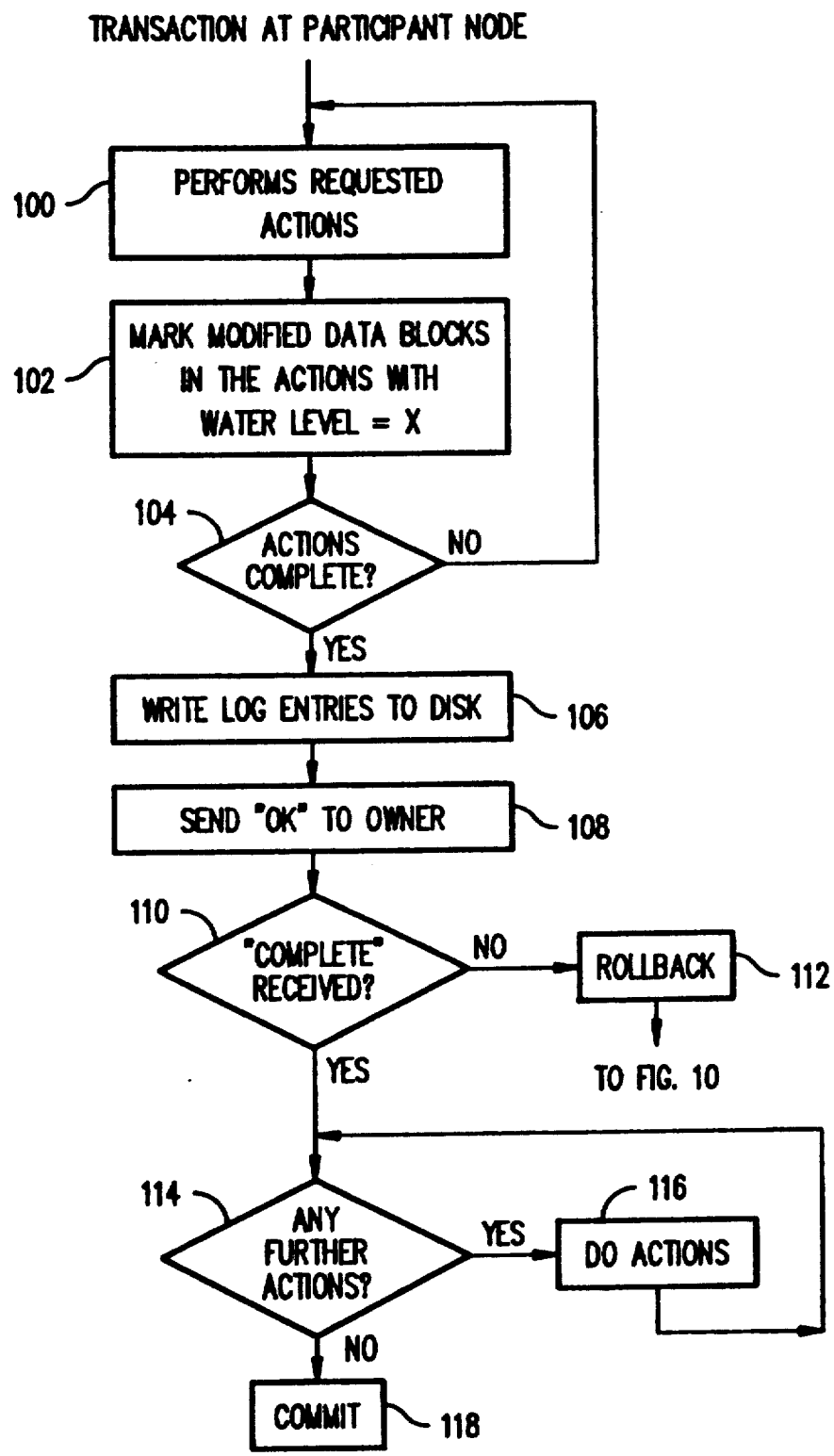
FIG. 9 is a high level flow diagram illustrating the operation of a transaction at a participant node.

Turning now to FIG. 9, a more detailed description of a transaction operation at a participant node is illustrated. In this instance, it is assumed that the participating node has received a request to perform a transaction from the originating node and has created its own transaction log record to enable a possible roll-back. At this stage, the participant node performs the requested actions (box 100) and marks any modified data blocks resulting from the action with an EOF value equal to X. In this case, X is equal to the EOF variable value then extant at the participant node (box 102), it being remembered that each participant node maintains its own independent log file.

If the actions are still not complete at the participant node (box 104), the system recycles to perform the requested actions and to prepare to complete the transaction. Once all actions are able to be completed (or rolled-back), the log entries are written to disk (box 106) and an "OK" message (box 108) is sent to the originating node. Then, if no "complete" message is returned from the owning node, (box 110) a rollback occurs at the participating node (box 112). If, however, a "complete" message is received from the originating node, then it is determined whether any further actions are required (box 114) and if so the actions are performed (box 117). If not, the commit procedure is performed (box 118) and the transaction is at an end.

Assume a system crash occurs before an originating node writes a commit mark in its log on disk but after the participating nodes have written commit marks in their logs. During system recovery, participating nodes, seeing their commit marks (but no transaction complete marks) inquire of the originating node as to the status of its commit mark. As no commit mark is present for the transaction, the originating node signals the participants to roll-back to the old data image state.

During the commit procedure, the originating node sends a message to the participating nodes that it has committed. Now the participating nodes know that new data images will be used, so they assure that their respective base data files are updated with new data images and write a transaction complete mark in their logs. The writing of all such transaction complete marks is transmitted to the originating node and it then puts a transaction complete mark in its log.

Figure 10:
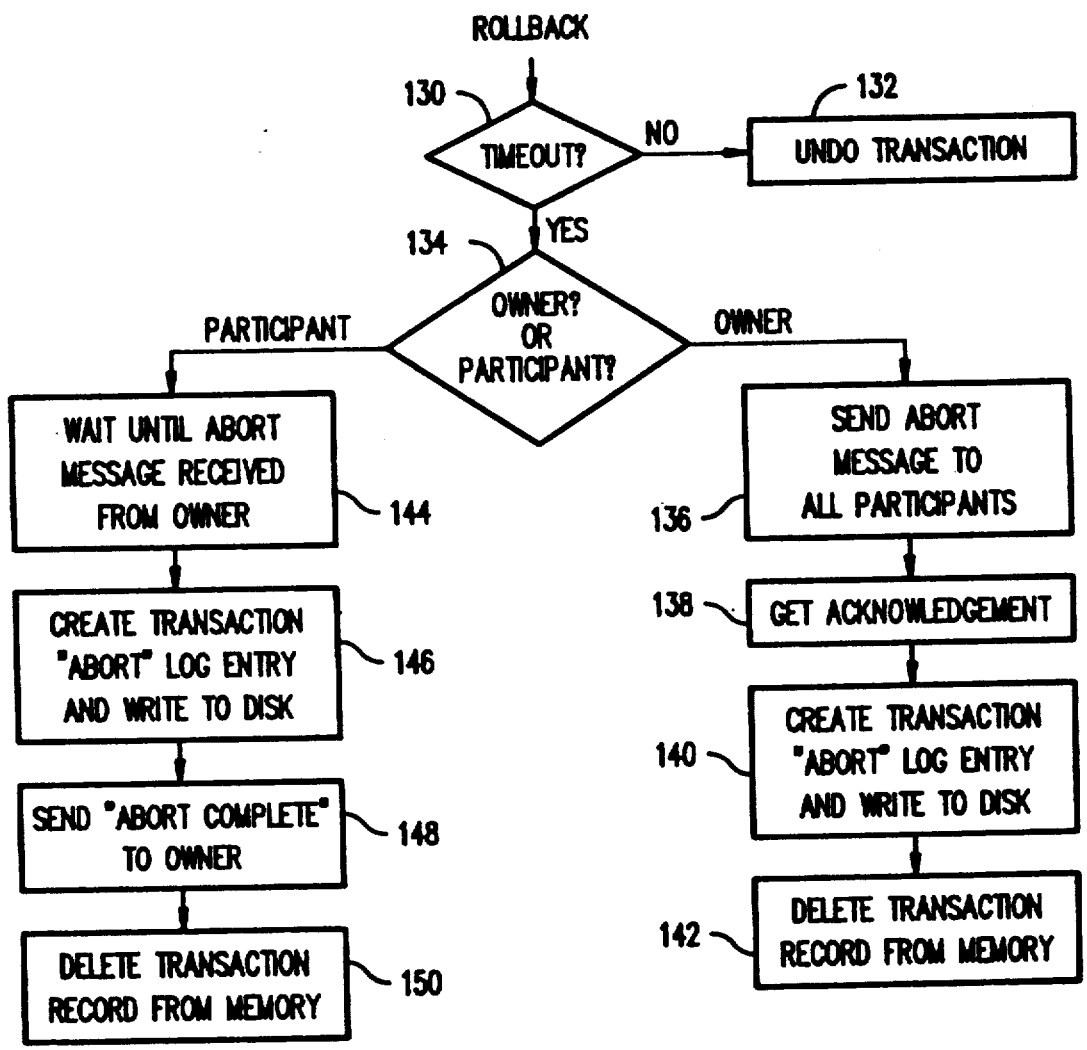
FIG. 10 is a high level flow diagram illustrating the operation of the invention when transaction rollback occurs.

Turning now to FIG. 10, the rollback procedure will be briefly described. There are two reasons a rollback action can occur: (1) the occurrence of a timeout indication signalling that the transaction has not completed within a prescribed time limit, or (2) a malfunction has occurred which has prevented the transaction from completing. If, as indicated in box 130 a timeout has not occurred, then by implication a malfunction has occurred and the transaction is undone (box 132) by reversing all actions which form parts of the transaction.

If a timeout has occurred, the next question to be answered is whether it occurred at an owning node or a participant node. If the timeout occurred at an owning node, an abort message is sent to all participants (box 136) and acknowledgements are received (box 138). A transaction "abort" entry is created and written to disk (box 140) and the transaction is deleted from memory (box 142). A similar action occurs at the participant node except that it waits until it receives the abort message from the owner (box 144) to accomplish the actions shown in boxes 146, 148, and 50.

Figure 11:
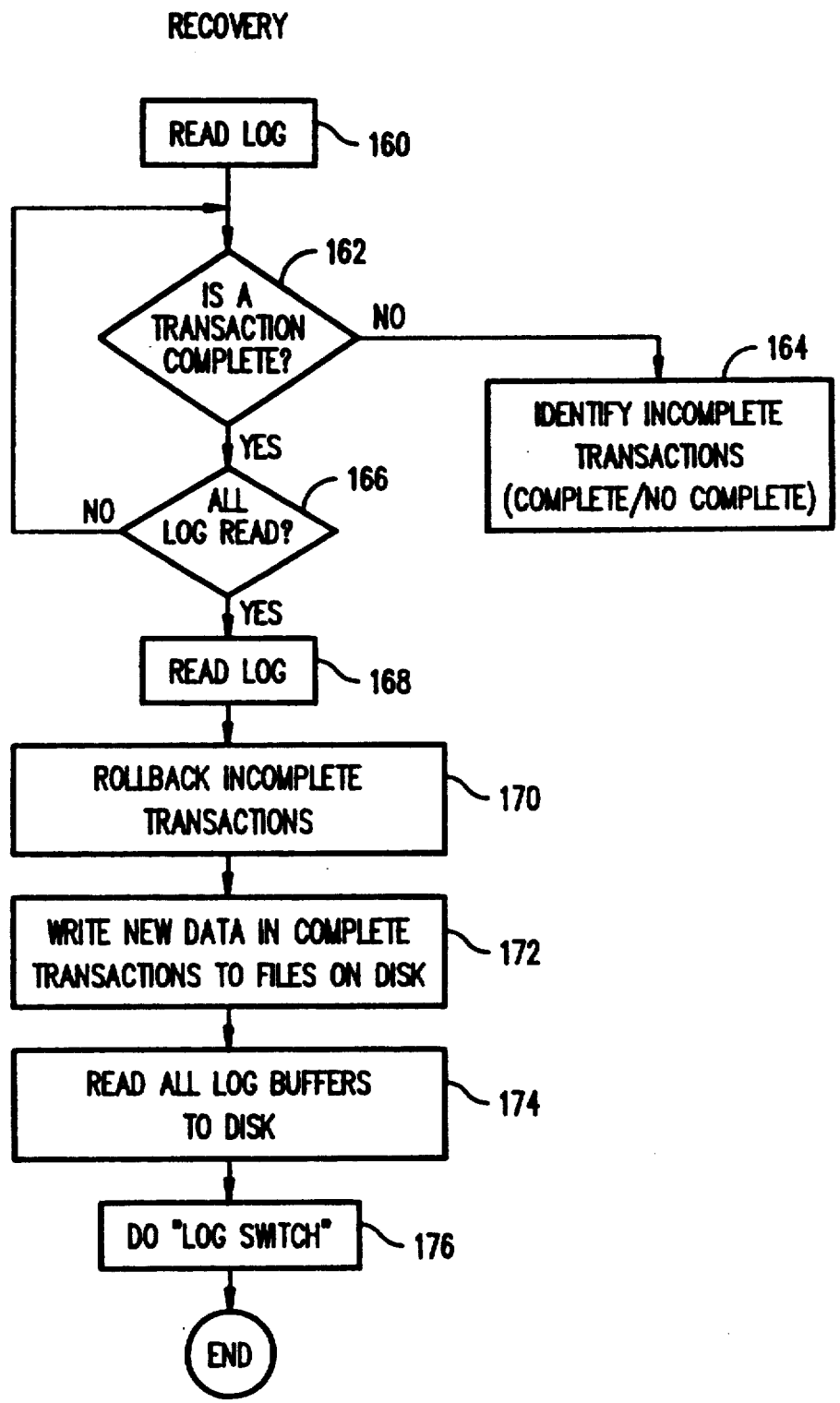
FIG. 11 is a high level flow diagram illustrating system recovery upon occurrence of a malfunction.

Turning now to FIG. 11, the method employed to recover from a malfunction at a node is illustrated. In this instance, it is assumed that the node has lost all volatile memory and that the only memory that remains is in nonvolatile memory (e.g. on disk).

The recovery procedure involves two successive reads of the log file. The first read (box 160) identifies all complete transactions (boxes 162 and 164) and those transactions which have no complete indication appended thereto. Once the log has been read (box 166) and incomplete transactions have been identified, it is reread (box 168). During this phase, all identified incomplete transactions are rolled back (box 170). In addition, since there is no way to know whether any new data image in a completed transaction record had been written out of the log and into its respective data file, all new data image in each complete transaction is written to its respective file on disk (box 172). Then, all volatile memory which contains log entries, is written to disk and into the log file and a log switch action occurs (box 176). At this stage, the system is again ready to commence operation.

A "log switch" action can occur at various times during the operation of a file system. When a current log file reaches a certain size, it needs to be truncated to avoid the need for allocating excessive memory to the log file. The first step in a log switch is creating a new log file and allocating its memory area.

This is accomplished as a transaction which is recorded in the old log file. Next, a pointer to the new log file is created and placed in memory. At this point, any entries corresponding to a transaction which started in the old log file are entered in the old log, but new transactions are entered into the new log. Thus, all transactions in process, complete in the old log and are not involved with the new log. If the system malfunctions during a log switch, the recovery procedure sets the old log file as the current log file but will find a "create-new-file" transaction in the old log which will tell it where to find the new log file.

Once the new log file is put into use, all transactions in the old log file must be resolved so that the old log file can be discarded. This occurs in several stages. First, any entries in volatile memory which include new data and are associated with the old log file are written to disk. Then, the system looks through the transaction records for any transactions started in the old log file but which are not yet ended. The system can choose to wait for a transaction to finish or it can copy all entries involving that transaction into the new log.

Once all transactions in the old log have been dealt with, a current log file pointer is updated to the new log file and is written to disk in an area reserved for directory indications (e.g. called a "superblock"). This action is also done as a transaction since this transaction is finished, a final transaction is carried out to delete the old log file and free all of the disk space it used. This transaction is recorded in the new log and the log switch is complete.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. In a data processing system which includes a file-based software system and volatile and nonvolatile memory, said data processing system controlled by said software system to modify recorded old data to create new data and to store said new data, said data processing system performing a file status recovery method comprising the computer implemented steps of:

providing a recorded log file of atomic file transactions that may span both said volatile and non volatile memory;

providing a first stored variable indicative of a number of data segments of said log file recorded in nonvolatile memory;

providing a second stored variable indicative of all data segments in said recorded log file which may span said volatile and non volatile memory including data segments in said log file recorded in volatile memory;

commencing a file transaction relating to recorded old data, recording an image of said recorded old data in said log file in volatile memory and assigning to said old data image, a value of said second variable;

performing said file transaction to create new data, recording an image of said new data in said log file in volatile memory and assigning to said new data image, the value of said second variable assigned to said old data image; and writing said new data image into nonvolatile memory only when the value of said second variable assigned to said new data image is equal to or less than the value of said first variable, indicating that said old data image is already recorded in said nonvolatile memory.

2. The method of claim 1 wherein said nonvolatile memory comprises a disk memories, and said first variable indicates a number of bytes of said log file recorded on said disk.

3. The method of claim 2 wherein said second variable indicates a total number of bytes in said recorded log file.

4. The method of claim 3 wherein a transaction's new data image is not written to a base data file on said disk memory until said transaction's old image has been written to disk memory.

5. The method of claim wherein said data processing system comprises a plurality of nodes, each node including computing means with volatile memory and nonvolatile memory, an atomic file transaction including file actions at more than one node, said method comprising the added steps of:

performing at a participant node, file actions requested by an originating node, said participant node employing locally generated first and second variables in the same manner as said originating node;

notifying said originating node of an ability to complete or roll-back said requested file actions at said participant node; and upon receipt of a subsequent commit instruction from said originating node, said participant node writing, in its nonvolatile memory, first a new data image derived as a result of said requested file actions at said participant node and then a completed mark to its log file.

6. In a data processing system which includes both volatile and nonvolatile memory and user inaccessible file control software, said data processing system controlled by software to modify recorded old data images to create new data images a method for recovering from a malfunction comprising the computer implemented steps of:

providing a recorded transaction log file to maintain a record of atomic file transaction occurring as a result of operations of said inaccessible file control software, said recorded transaction log file spanning said volatile and nonvolatile memories;

recording in said volatile memory, old data images and new data images which occur during a transaction;

recording said old data images and new data images to a portion of the transaction log file recorded in said nonvolatile memory; and in the event of a malfunction, employing said recorded transaction log file in nonvolatile memory to roll rack a transaction to said old data image state in the event said malfunction occurred prior to completion of a transaction.

7. The method as defined in claim 6 wherein said new data image is not written to nonvolatile memory until said old data image is recorded in said nonvolatile memory.

8. The method as defined in claim 7 wherein said employing step further comprises: reading said recorded transaction said log file in nonvolatile memory; determining from said recorded transaction log file which file transactions are incomplete and rolling such transactions back to their old data image state; and writing any images of new data contained in completed transactions in said recorded transaction log file, to their respective base files contained in said nonvolatile memory.

9. In a data processing system comprised of a plurality of computers, each said computer having both volatile and non-volatile memory, each said computer modifying recorded old data to create new data and storing said new data, said system including a file-based software system distributed across said computers and including file control software that is inaccessible to a user for controlling individual microscopic file transactions, said system performing a file recovery method comprising the computer implemented steps of:

providing a recorded log file for atomic file transactions occurring as a result of operation of said file control software in each said computer;

commencing a file transaction in one said computer relating to old data and recording an image of said old data in said computer's log file in volatile memory;

performing said file transaction to create new data, and recording an image of said new data in said computer's log microscopic file in volatile memory; and writing said new data image into said computer's nonvolatile memory only after said old data image has been written into said computer's log microscope file in nonvolatile memory, whereby said old data image is preserved in nonvolatile memory in the event a system failure occurs prior to said new data image being written to nonvolatile memory.

10. The method of claim 9 wherein said new data image is written into a base data file after said old data image is written into the log file in said computer's nonvolatile memory.

11. The method of claim 10, wherein an atomic file transaction includes microscopic file actions in more than one computer, said method comprising the added steps of:

performing at a participant computer, file actions requested by an originating computer;

notifying said originating computer of an ability to complete or rollback said requested file actions at said participant computer; and upon receipt of a subsequent instruction from said originating computer, said participant computer writing in its nonvolatile memory, a new data image derived as a result of said requested file actions at said participant computer and a completed mark to its log file.

* * * * *

UNITED STATES PATENT AND TRADEMARK OFFICE
CERTIFICATE OF CORRECTION

PATENT NO.  : 5,201,044
DATED       : April 6, 1993
INVENTOR(S) : Frey, Jr. et al.

It is certified that error appears in the above-identified patent and that said Letters Patent is hereby corrected as shown below:

In Col. 10, line 68, "memories" should read --memory--.

In Col. 11, line 10, after the word "claim" insert --1--.

In Col. 11, line 39, the word "transaction" should read --transactions--.

In Col. 11, line 52, the word "rack" should read --back--.

In Col. 12, line 24, after the word "a" add --microscopic--.

In Col. 12, line 28, after the word "said" add --microscopic--.

In Col. 12, line 30, delete the word "microscopic".

In Col. 12, line 34-35, delete the word "microscopic".

Signed and Sealed this

Thirtieth Day of November, 1993

Attest:

BRUCE LEHMAN

Attesting Officer

Commissioner of Patents and Trademarks